US010666916B1

(12) United States Patent
Tabirian et al.

(10) Patent No.: US 10,666,916 B1
(45) Date of Patent: May 26, 2020

(54) MODULATED CIRCULAR POLARIZATION VIEWING SYSTEM

(71) Applicant: Beam Engineering for Advanced Measurements Co., Orlando, FL (US)

(72) Inventors: Nelson V. Tabirian, Winter Park, FL (US); David E. Roberts, Apopka, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 0 days.

(21) Appl. No.: 16/287,436

(22) Filed: Feb. 27, 2019

(51) Int. Cl.
*H04N 9/31* (2006.01)
*G02B 27/28* (2006.01)
*G02B 5/20* (2006.01)
*H04B 10/532* (2013.01)

(52) U.S. Cl.
CPC .............. *H04N 9/3167* (2013.01); *G02B 5/20* (2013.01); *G02B 27/286* (2013.01); *H04B 10/532* (2013.01)

(58) Field of Classification Search
CPC ........ G03B 21/14; G03B 21/56; G03B 21/62; G03B 21/562; G03B 21/565; G03B 21/567; G03B 21/602; G03B 21/604; G03B 21/606; G02C 7/04; G02C 7/12; G02C 7/049; G02C 7/083; G02C 7/102; G02C 7/104; G02C 7/105
See application file for complete search history.

(56) References Cited

U.S. PATENT DOCUMENTS

| 4,719,507 A | 1/1988 | Bos |
| 10,191,296 B1 | 1/2019 | Tabirian et al. |
| 2014/0268326 A1* | 9/2014 | Pugh .................... G02C 7/083 359/465 |
| 2015/0081016 A1* | 3/2015 | De Sio ................... G02C 7/04 623/6.22 |
| 2016/0282639 A1* | 9/2016 | von und zu Liechtenstein ........... G01J 4/00 |
| 2017/0307892 A1* | 10/2017 | Freeman .............. G02B 5/0236 |

OTHER PUBLICATIONS

Beam Engineering for Advaced Measurements Co., et al., PCT Application No. PCT/US2016/038566 filed Jun. 22, 2016, Notification of Transmittal of the International Search Report and the Written Opinion of the International Searching Authority, or the Declaration dated Oct. 10, 2016, 16 pages.
Marrucci, et al., Pancharatnam-Berry phase optical elements for wave front shaping in the visible domain, Appl. Phys. Lett. 88, 2006, 3 pages.
Sobolewska et al., "On the inscription of period and half period surface relief gratings in azobenzene-functionalized polymers", J. Phys. Chem., vol. 112 (15) Jan. 3, 2008, 10 pages.
Barrett et al., Model of laser driven mass transport in thin films of dye-functionalized polymers, J. Chem. Phys., vol. 109 (4), Jul. 22, 2009, 13 pages.

(Continued)

*Primary Examiner* — Sultan Chowdhury
(74) *Attorney, Agent, or Firm* — Brian S. Steinberger; Hilary F. Steinberger; Law Offices of Brian S. Steinberger, P.A.

(57) ABSTRACT

Modulated circular polarization viewing systems and methods that cause temporal modulation of color, brightness, or both, of objects treated with materials having differential polarization reflectance.

14 Claims, 5 Drawing Sheets

(56) References Cited

OTHER PUBLICATIONS

Vernon, J., et al., Recording Polarization Gratings with a Standing Spiral Wave, Applied Physics Letters, Oct. 2013, vol. 103, 4 pages.
Gerchberg, et al., practical algorithm for the determination of the phase from image and diffraction plane pictures, 1972, Optik, vol. 35, Issue 2, pp. 237-246, 10 pages.
Serak, et al. Diffractive Waveplate Arrays [Invited], Journal of the Optical Society of America B, May 2017, pp. B56-B63, vol. 34, No. 5, 8 pages.
Emoto, Optical and Physical Applications of Photocontrollable Materials: Azobenzene-Containing and Liquid Crystalline Polymers, Polymers,Jan. 2012, 150-186, vol. 4, 38 pages.
Pepper, M. et al, Nonlinear Optical Phase Conjugation, IEEE, Sep. 1991, pp. 21-34, 14 pages.
De Sio, L., et al., "Digital Polarization Holography Advancing Geometrical Phase Optics," 2016, Optics Express, vol. 24, Issue 16, pp. 18297-18306, 10 pages.
Borek, G. and D. Brown, "High-performance diffractive optics for beam shaping," 1999, Proceedings of SPIE, vol. 3633, pp. 51-60, 10 pages.
Tabiryan, et al., Broadband waveplate lenses, Optics Express 7091, vol. 24, No. 7, Mar. 24, 2016, 12 pages.
Tabiryan, et al. Thin waveplate lenses of switchable focal length—new generation in optics, Optics Express 25783, vol. 23, No. 20, Sep. 19, 2015, 12 pages.
Tabiryan, et al. Superlens in the skies: liquid-crystal-polymer technology for telescopes, Newsroom, 2016, 2 pages.
Nersisyan, et al., The principles of laser beam control with polarization gratings introduced as diffractive waveplates, Proc. of SPIE, vol. 7775, 2010, 10 pages.
Heller, A Giant Leap for Space Telescopes, Foldable Optics, S&TR, Mar. 2003, 7 pages.
Beam Engineering for Advanced Measurements Co., PCT Application No. PCT/US2015025186, The Extended European Search Report, filed Mar. 8, 2017, 13 pages.
Blinov, et al., Electrooptic Effects in Liquid Crystal MAterials, Springer-Verlag New York. 1994, 17 pages.
Crawford, et al., Liquid Crystals in Complex Geometries; Formed by Polymer and Porous Networks, Taylor and Francis, 1996, 4 pages.
Honma, et al., Liquid-Crystal Fresnel Zone Plate Fabricated by Microorubbing, Japanese Journal of Applied Phsyics, vol. 44, No. 1A, 2005, 4 pages.
Tabirian, N., et al., U.S. Appl. No. 61/757,259, filed Jan. 28, 2013, 29 pages.
Hrozhyk, et al., "Optical tuning of the reflection of cholesterics doped with azobenzene liquid crystals," Advanced Functional Materials, vol. 17., 2007, 8 pages.
Tabiryan, et al., "The promise of diffractive waveplates," Optics and Phontonics News, Mar. 2010, 6 pages.
Hrozhyk, et al., "Optically switchable, rapidly relaxing cholesteric liquid crystal reflectors," Optics Express, Apr. 2010, 7 pages.
White, et al., "Photoinduced broadening of cholesteric liquid crystal reflectors," Journal of Applied Physics, 2010, 6 pages.
Snik, et al., "An overview of polarimetric sensing techniques arid technology with applications to different research fields," Proceedings of SPIE, vol. 9099, 2014, 21 pages.
Anderson, G., et al., Broadband Antihole Photon Sieve Telescope, Applied Optics, vol. 16, No. 18., Jun. 2007, 3 pages.
Early, J. et al., Twenty Meter Space Telescope Based on Diffractive Fresnel Lens, SPIE, U.S. Department of Energy, Lawrence Livermore National Laboratory, Jun. 2003, 11 pages.
Martinez-Cuenca, et al., Reconfigurable Shack-Hartmann Sensor Without Moving Elements,Optical Society of America, vol. 35, No. 9, May 2010, 3 pages.
Serak, S., et al., High-efficiency 1.5 mm Thick Optical Axis Grating and its Use for Laser Beam Combining, Optical Society of America, vol. 32, No., Jan. 2007, 4 pages.
Ono et al., Effects of phase shift between two photoalignment substances on diffration properties in liquid crystalline grating cells, Appl. Opt. vol. 48, Jan. 2009, 7 pgs.
Naydenova et al., "Diffraction form polarization holographic gratings with surface relief in side chain azobenzene polyesters" J. Opt. Soc. Am. B, vol. 15, (1998), 14 pages.
Oh et al., Achromatic polarization gratings as highly efficient thin-film polarizing beamsplitters for broadband light Proc. SPIE vol. 6682, (2007), 4 pages.
Nersisyan, S., et al., Polarization insensitive imaging through polarization gratins, Optics Express, vol. 17, No. 3, Feb. 2, 2009, 14 pages.
Oise, Optics in the Southeast, Technical Conference and Tabletop Exhibit, Optical Society of America, Orlando, FL., Nov. 12-13, 2003, 9 pages.
Dierking, Polymer Network-Stabilized Liquid Crystals, Advanced Materials, vol. 12, No. 3, 2000, 15 pages.

\* cited by examiner

MODULATED CIRCULAR POLARIZATION VIEWING SYSTEM

FIELD OF THE INVENTION

This invention relates generally to the field of optics, and in particular to systems, methods, imagers, and polarizers, for circularly-polarized light, and other circularly-polarized electromagnetic radiation.

BACKGROUND AND PRIOR ART

Most systems used for imaging light or other electromagnetic radiation, including the human eye, have little or no sensitivity to the polarization of the light or other electromagnetic radiation. In some cases, such as the case of polarizing sunglasses, an external filter with specific polarization properties is used in order to provide benefits, such as suppression of the glare from road surfaces, especially wet road surfaces, viewed from a motor vehicle.

With the exception of a light reflected from a few rare species of beetles, there are no significant natural sources of light or other electromagnetic radiation that is circularly polarized. Therefore, manmade objects from which circularly-polarized light emanates can be detected and recognized based on this polarization characteristic, without the need for evaluating any other characteristic.

With available technology, it has become possible to produce imager systems that allow the visualization of differential circular polarization in imaged light or other electromagnetic radiation. It has also become possible to produce paints, pigments, or other treatments of objects such that when such objects are illuminated with unpolarized light or other unpolarized electromagnetic radiation, the electromagnetic radiation emanating from these objects is fully or partially circularly polarized.

There are many potential applications of objects that have differential circular polarization reflectance, together with imagers that can be used to allow the detection of such differential circular polarization reflectance. One such potential application is the detection of marked objects in a cluttered scene. Harrowing descriptions of the difficulty of searching for survivors of accidents at sea make it obvious that improvements in the ability to detect objects such as life jackets on the ocean surface could mean the difference between life and death for such survivors. Life jackets with differential circular polarization reflectance, when viewed with appropriate equipment, would be much easier to detect than conventional life jackets, even conventional life jackets with distinctive coloring. In entertainment applications, it could be useful to be able to make selected objects appear to pulse or blink without any such pulsing or blinking of the scene within which the selected objects are embedded. In tagging or marking of products or currency, it would be beneficial if tags or marks could be made visible with special equipment, even though the tags or marks are not visible without such special equipment.

At the present time, there is no system or method available for purchase that provides the combination of such objects with differential circular polarization reflectance along with the associated viewing or imaging equipment.

FIG. 1 illustrates a principle known from prior art that allows the creation of paints, pigments, or treatments that result in the light emanating from a treated object to be circularly polarized over a broad spectral bandwidth when the object is illuminated with unpolarized light. To produce this desired broad spectral bandwidth, a chiral material such as a cholesteric liquid crystal polymer (CLCP) film is fabricated in such a way that the pitch of the chiral structure comprising the film has a gradient in the direction perpendicular to the surface of the film.

In the example shown in FIG. 1, a chiral structure of a CLCP or other transparent anisotropic material results in reflection of one circular polarization and transmission of the other circular polarization. The pitch of the chiral structure is small near the surface of the film, resulting in the reflection of radiation of one circular polarization in the blue region of the spectrum. The pitch of the chiral structure is moderate in the middle of the film, resulting in the reflection of radiation of one circular polarization in the green region of the spectrum. The pitch of the chiral structure is large at the back of the film, resulting in the reflection of radiation of one circular polarization in the red region of the spectrum. An absorber behind the film absorbs light with the circular polarization that is not reflected.

The result of illuminating a film such as the one illustrated in FIG. 1 with unpolarized light is that the light reflected from the surface is circularly polarized over a broad spectral band. Thus, with materials of this type, paints, pigments, and other treatments can be fabricated such that treated objects emanate circularly-polarized light over a broad spectral band.

Thus, there is a need for systems and methods for producing objects with differential circular polarization reflectance, together with equipment that allows the detection and visualization of such objects.

SUMMARY OF THE INVENTION

It is an object of the present invention to provide a modulated circular polarization viewing system that provides paints, pigments, or other treatments of objects in order to make these objects have differential circular polarization reflectance, along with a modulated circular polarization filter (MCPF) that allows detection and visualization of the differential circular polarization reflectance of the painted, pigmented, or otherwise treated object.

Another object of the present invention is to provide the ability to detect at long distance objects that are painted, pigmented, or otherwise treated in such a way that these objects have differential circular polarization reflectance.

An embodiment of a modulated circular polarization viewing system can include (1) paints, pigments, or other treatments of objects such that when the objects are illuminated with unpolarized light or other unpolarized electromagnetic radiation, the light or other electromagnetic radiation emanating from the object is fully or partially circularly polarized; (2) a source of unpolarized illumination; (3) a viewing subsystem; and (4) in the optical path of the viewing subsystem, a modulated circular polarization filter that temporally modulates the circular polarization of the light or other electromagnetic radiation passing through said filter, without modulating the total optical power passing through said filter from unpolarized sources of radiation.

The modulated circular polarization filter can include at least a broadband quarter-wave plate, a 90 degree twisted nematic liquid crystal cell meeting a Mauguin condition, a linear polarizer, and a controller for modulating the twisted nematic liquid crystal cell.

The light or other electromagnetic radiation emanating from the paints, pigments, or other treatments of objects can be primarily of one circular polarization over most or all of the bandwidth of the viewing subsystem.

The light or other electromagnetic radiation emanating from the paints, pigments, or other treatments of objects can have the property that the ratio of the emanated optical power of one circular polarization to the emanated optical power of the other circular polarization is dependent on wavelength within the bandwidth of the viewing subsystem.

At any given time within the modulation period of the modulated circular polarization filter, the transmittance of optical power through said filter can be higher for one circular polarization than for the other circular polarization over most or all of the bandwidth of the viewing subsystem.

At any given time within the modulation period of the modulated circular polarization filter, the ratio of the transmittance of optical power of one circular polarization through said filter to the transmittance of optical power of the other circular polarization through said filter is dependent on wavelength within the bandwidth of the viewing subsystem.

Another embodiment of a modulated circular polarization viewing system can include (1) paints, pigments, or other treatments of objects such that when the objects are illuminated with unpolarized light or other electromagnetic radiation, the light or other electromagnetic radiation emanating from the object is fully or partially circularly polarized; (2) a source of unpolarized illumination; (3) a viewing subsystem; and (4) in the optical path of the source of unpolarized illumination, a modulated circular polarization filter that temporally modulates the circular polarization of the light or other electromagnetic radiation passing through said filter, without modulating the total optical power passing through said filter from said source of unpolarized illumination.

The modulated circular polarization filter can include at least a broadband quarter-wave plate, a 90 degree twisted nematic liquid crystal cell meeting a Mauguin condition, a linear polarizer, and a controller for modulating the twisted nematic liquid crystal cell.

The light or other electromagnetic radiation emanating from the paints, pigments, or other treatments of objects can be primarily of one circular polarization over most or all of the bandwidth of the viewing subsystem.

The light or other electromagnetic radiation emanating from the paints, pigments, or other treatments of objects can have the property that the ratio of the emanated optical power of one circular polarization to the emanated optical power of the other circular polarization is dependent on wavelength within the bandwidth of the viewing subsystem.

At any given time within the modulation period of the modulated circular polarization filter, the transmittance of optical power through said filter is higher for one circular polarization than for the other circular polarization over most or all of the bandwidth of the viewing subsystem.

At any given time within the modulation period of the modulated circular polarization filter, the ratio of the transmittance of optical power of one circular polarization through said filter to the transmittance of optical power of the other circular polarization through said filter is dependent on wavelength within the bandwidth of the viewing subsystem.

Further objects and advantages of this invention will be apparent from the following detailed description of the presently preferred embodiments which are illustrated schematically in the accompanying drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2A has the scene viewed by a person looking through an MCPF.

DESCRIPTION OF THE PREFERRED EMBODIMENTS

Figure 1:
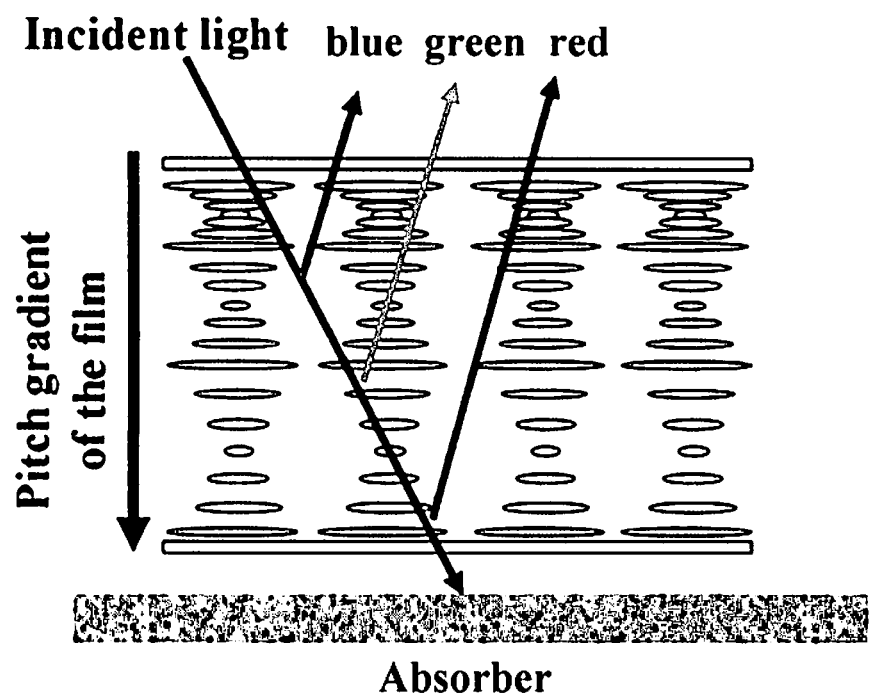
FIG. 1 illustrates the prior art of materials or films having a chiral structure wherein the pitch of the chiral structure has a gradient along the axis perpendicular to the surface of the material or film. Such materials and films are known from prior art to reflect one circular polarization of light over a broad band, and to transmit light of the other circular polarization. Addition of an absorber to the chiral film results in light that is not reflected being absorbed.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
210 Scene includes a life jacket that has been treated to have differential circular polarization reflectance.
220 Person (imager) viewing scene through an MCPF (modulated circular polarization filter), can include viewing subsystem such as high-speed FPA (focal plane array) based camera.
230 Source of unpolarized illumination
240 MCPF (modulated circular polarization filter)
250 lens or lens system that images a scene onto a focal plane array (FPA)
260 focal plane array
310 Scene of objects viewed by person
320 person viewing scene (viewer)
330 source of unpolarized light illumination
340 MCPF (modulated circular polarization filter)
410 viewing subsystem
430 linear polarizer
440 90 degree twisted nematic (TN) liquid crystal cell meeting a Maguin condition
450 broadband quarter-wave plate
460 controller that temporally modulates the TN cell
470 three optical components, which together with the controller 460, constitute the modulated circular polarization filter (MCPF)

In the discussions herein, the term "light" will be used to describe not only electromagnetic radiation with wavelengths in the visible spectral region, but also electromagnetic radiation with wavelengths in other bands, including but not limited to ultraviolet and infrared spectral bands. Also, the property of an object described as "differential circular polarization reflectance" will be used to mean that when such an object is illuminated with unpolarized light, the light emanating from the object will be partially or completely circularly polarized.

Although there are many sources of linearly-polarized light in the natural world, there are very few sources of circularly-polarized light in the natural world. Sources of linearly polarized light include sunlight reflected from almost any smooth surface at a grazing angle. This includes, for example, sunlight reflected from shiny tree leaves, from the surfaces of bodies of water, and from wet roadways. One of the benefits of polarized sunglasses is that they preferentially block the linearly polarized light that is reflected from road surfaces, especially wet road surfaces, at grazing angles.

There are at least two major advantages of using circular polarization to tag objects in a scene, instead of using linear polarization. The most important advantage is that there are practically no natural sources of circularly-polarized light, so an object from which circularly-polarized light emanates can be detected and recognized just on the basis of the polarization of light from the object. The second major advantage is that the transmission of light through a circular polarization filter is not affected by rotation of the filter about the axis of propagation of the light. This is in contrast to the situation with linearly polarized light, for which the transmission through a linear polarization filter varies as the filter is rotated about the viewing direction. This variation is not a problem with sunglasses, since the long dimension of sunglasses is normally parallel to the horizon. But in general, the relative orientation of the source of polarized radiation and the filter cannot be controlled, so it is better if the optical properties, including transmission of light, be independent of this orientation.

In order to take advantage of the unique properties of circularly polarized light, it is desirable to find paints, pigments, or other treatments with which to cover objects, such that when the treated object is illuminated with unpolarized light, the light emanating from the object is partially or completely circularly polarized. With the modern technology of chiral materials, including cholesteric liquid crystals (CLCs) and cholesteric liquid crystal polymers (CLCPs), this has become possible. In order to take advantage of the full bandwidth of the imager that is used to view the treated objects, it is desirable that the radiation emanating from the treated object be circularly polarized over as much of the spectral bandwidth of the imager as possible. This requires paints, pigments, or other treatments that emanate light that is circularly polarized over a broad spectral bandwidth.

Figure 2A:
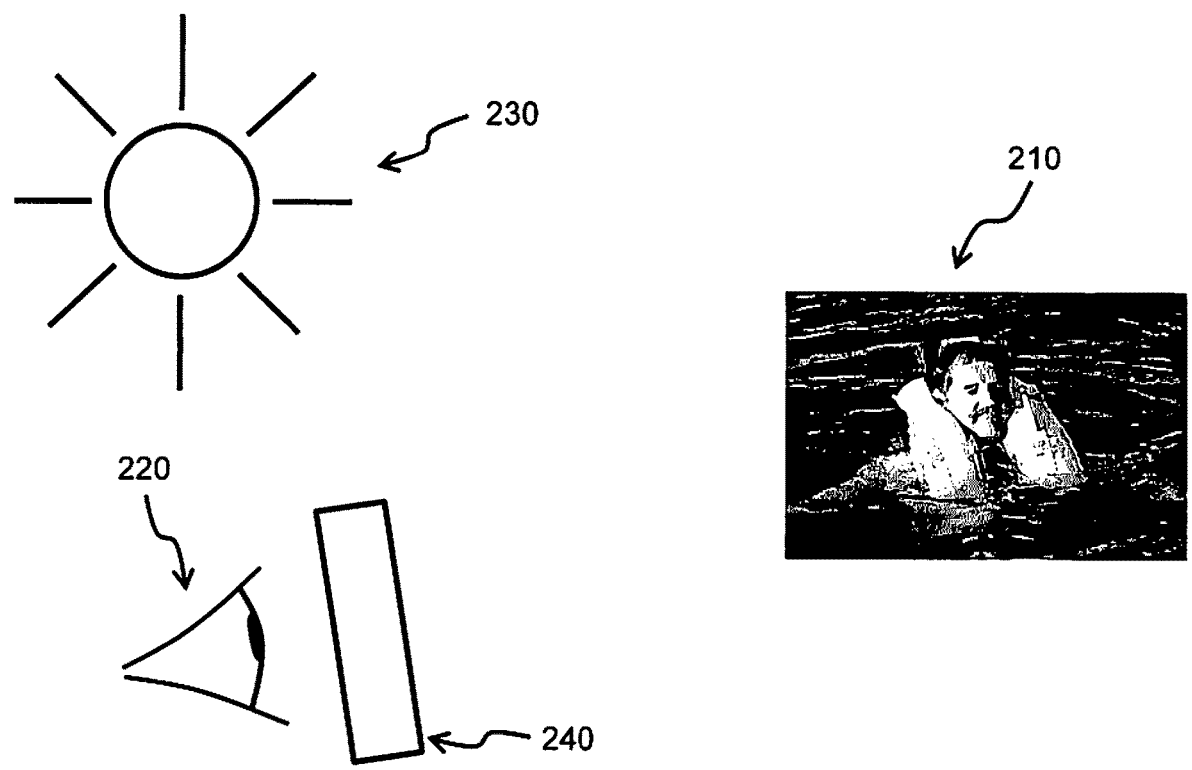
FIG. 2A illustrates the illumination with natural unpolarized light of a scene containing a person wearing a life jacket. The life jacket is covered with a paint, pigment, or other treatment that results in the light emanating from the life jacket being partially or completely circularly polarized. When viewed through an MCPF with appropriate modulation, the life jacket would appear to blink.
Figure 2B:
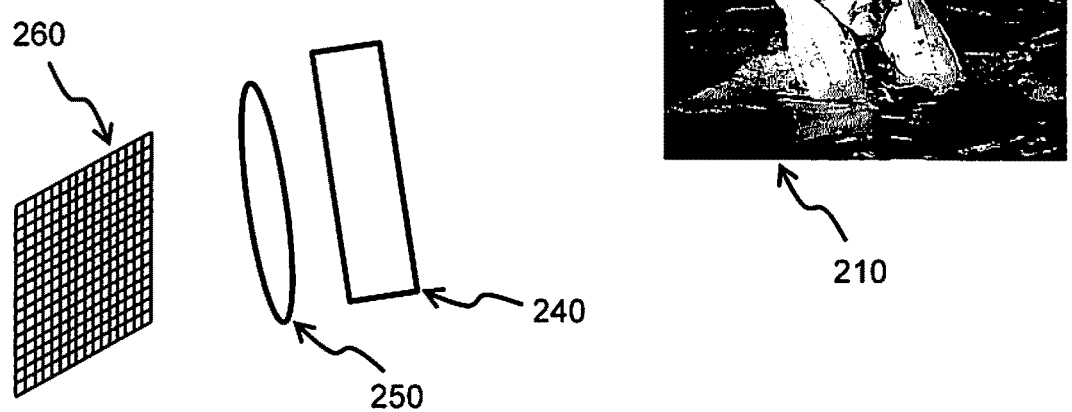
FIG. 2B is similar to FIG. 2A, with the scene viewed by a camera employing a focal plane array (FPA) imager, looking through an MCPF.

FIGS. 2A and 2B illustrates a scenario wherein a treated object is detected and recognized based on its treatment with a film such as the one illustrated in FIG. 1. In FIG. 2A, a scene 210 includes a life jacket that has been treated to have differential circular polarization reflectance. A person 220 views the scene through an MCPF 240. A source 230 of unpolarized illumination, such as the sun or the moon, illuminates the scene containing the life jacket. An MCPF 240 causes the life jacket to appear to blink, while it has no effect on the appearance of other parts of the scene. Due to this blinking, the person 220 is therefore able to detect the life jacket in a cluttered scene at longer range than would be the case if the life jacket only had a distinctive color, but no differential polarization reflectance. FIG. 2B is the same as FIG. 2A, except that the source of unpolarized illumination is shown in FIG. 2A but not in FIG. 2B, and the scene is viewed directly by a person through the MCPF in FIG. 2A, and by a camera system consisting of a lens or lens system 250 and a focal plane array 260 in FIG. 2B.

For purposes of describing the imager 220 with which the scene 210 is viewed in FIG. 2, we will refer to this imager as the viewing subsystem. For purposes of illustration, in FIG. 2A a person 220 is the viewing subsystem viewing the scene through the MCPF 240, but using an alternative imager such as but not limited to a camera with a focal plane array (FPA) of photodetectors has major advantages in searching for a small object such as a life jacket in a large scene such as the sea below a search helicopter. FIG. 2B illustrates the use of a lens system 250 with an FPA of photodiodes 260 as the viewing subsystem. One major advantage of using an FPA-based camera as the viewing subsystem, instead of using a human observers as the imaging subsystem, is that if a high-speed FPA based camera is used as the viewing subsystem, the rate at which the MCPF modulates the scene can be orders of magnitude higher than it could be if a human being views the scene directly through the MCPF 240.

The focal plane array (FPA) can include a focal plane array (FPA), such as those described in U.S. Pat. No.

9,976,911 to the same Assignee as the subject patent application, which is incorporated by reference in its entirety.

The reason that a viewing subsystem based on a camera employing a high-speed FPA would allow a faster rate of MCPF modulation is that the human eye-brain system cannot perceive modulation at rates higher than about 10 Hz, whereas some modern high-speed cameras can detect modulation at rates of many kilohertz. Using such a high-speed imager as the viewing subsystem would allow much smaller MCPF-induced changes in the transmittance of light through the MCPF 240 from the treated life jacket in scene 210 to be detected than would be the case if the viewing subsystem is a human being. It can be envisaged that if life jackets were provided with differential circular polarization reflectance, a rescue helicopter with cameras based on high-speed FPAs, viewing the sea all around the helicopter simultaneously through MCPFs, would be far more likely to detect survivors of accidents at sea than is the case today. Currently, searches are often conducted primarily by helicopter crew members directly searching the sea surface by eye.

Figure 3:
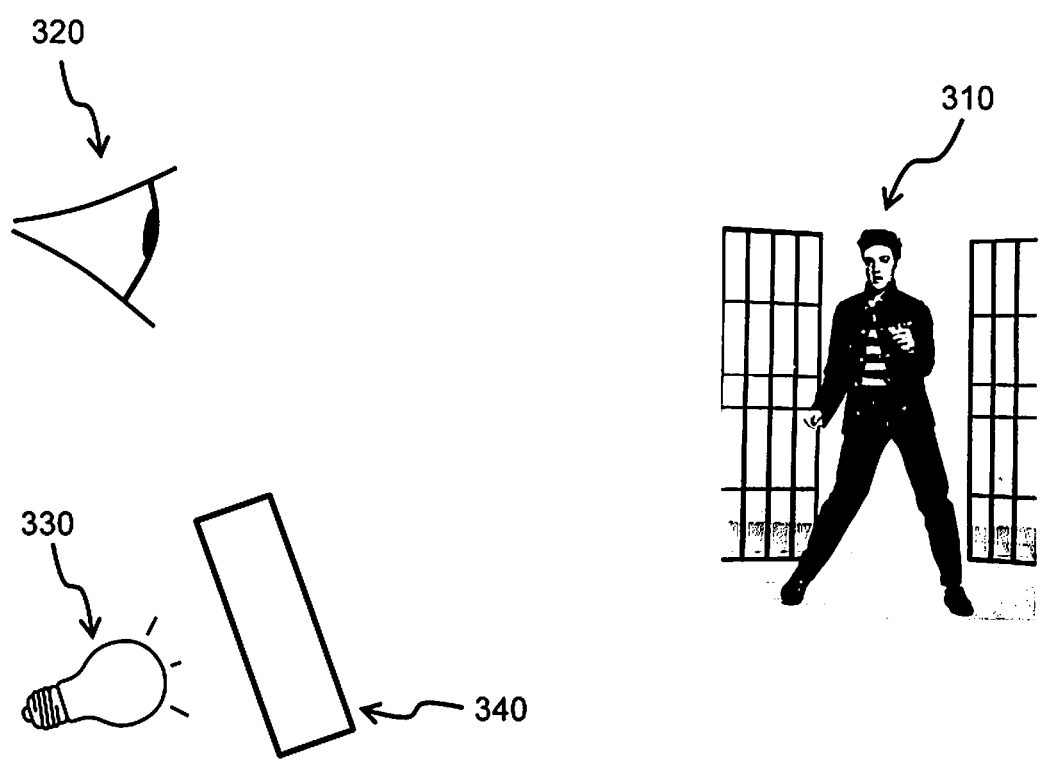
FIG. 3 illustrates an entertainer wearing clothing that includes a paint, pigment, or other treatment that results in differential circular polarization reflectance. Objects in the scene other than the entertainer's clothing are not treated, and therefore have negligible differential circular polarization reflectance. The entertainer and the surrounding scene are illuminated by a source of unpolarized light, filtered by an MCPF. When directly viewed, the treated clothing will appear to pulse, blink, or change color, while other elements of the scene will not.

FIG. 3 illustrates a scenario wherein a treated object is made to appear to blink or change color by means of illumination with a modulated source of circularly-polarized light. The parts of the scene other than the treated object do not appear to blink or change color. The scene 310 being viewed by a person 320 contains objects that have been treated such that they have differential circular polarization reflectance. Unpolarized light from a source of illumination 330 passes through an MCPF 340, resulting in no temporal modulation in the optical illumination power, but partial or complete temporal modulation of the circular polarization of the optical illumination. The parts of the scene that have no differential circular polarization reflectance do not appear to the viewer 320 to pulse or blink because the average optical power passing through the MCPF is not modulated, but the treated object does appear to pulse or blink due to its differential circular polarization reflectance.

The simplest implementation of the system illustrated in FIG. 3 is one wherein the overall brightness of the treated objects in the scene 310 as seen by viewer 320 blinks or pulses, while the color of the scene does not change. There are numerous variants of this, involving spectral sectioning of either the treated objects in the scene 310, the modulated polarization filter 340, or both. For example, the pigments or paints used to treat objects such as the entertainer's clothing in scene 310 could be divided into any combination of different colors, while the MCPF 340 modulates the transmission of light for the entire visible spectral band between left hand circular polarization (LHCP) and right-hand circular polarization (RHCP).

If the treated objects in the scene 310 emanate mostly red and blue LHCP light and green RHCP light, then the color of the treated objects could pulse or change as the MCPF is modulated. This keeps the MCPF simple, since the combination of the illumination source 330 and the MCPF 340 in FIG. 3 it is simply a broadband source of circularly polarized light, with the handedness of this light temporally modulated between LHCP and RHCP. This implementation can be described as one wherein the ratio of the emanated optical power from the treated objects in the scene 310 of one circular polarization to the emanated optical power of the other circular polarization is dependent on wavelength within the bandwidth of the viewing subsystem. The viewing subsystem 320 in the case illustrated in FIG. 3 is a human observer.

Another variant of the system illustrated in FIG. 3 is one wherein the color of the treated objects in the scene 310 can be arbitrarily changed by changing the spectral properties of the MCPF 340. As an example, consider the case wherein the treated objects in scene 310 preferentially reflect LHCP light for all wavelengths within the bandwidth of the viewing subsystem 320, which in the case illustrated is a human observer. The MCPF 340 can be designed to be emanate LHCP light in one part of the spectral bandwidth of the viewing subsystem, and to emanate RHCP in another part of the spectral bandwidth of the viewing subsystem. This implementation can be described as one wherein the ratio of the transmittance of optical power of one circular polarization through said filter to the transmittance of optical power of the other circular polarization through said filter is dependent on wavelength within the bandwidth of the viewing subsystem.

Figure 4:
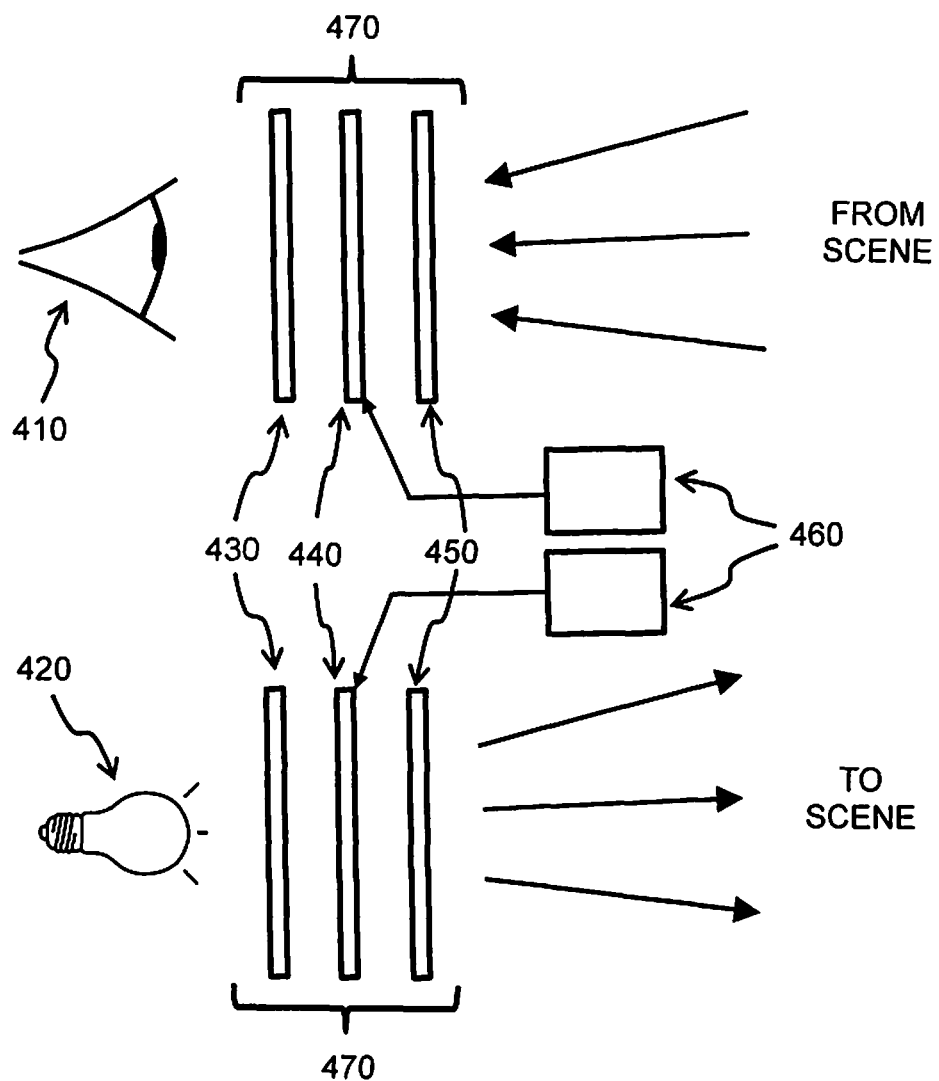
FIG. 4 illustrates on possible implementation of an MCPF. When a scene is viewed through the MCPF, elements in the scene that is illuminated with unpolarized light will appear to blink if and only if they have differential circular polarization reflectance. If the light from source of unpolarized illumination such as a light bulb passes through the MCPF, the circular polarization of the light will be temporally modulated.

FIG. 4 illustrates one possible implementation of the MCPFs illustrated in FIG. 2 and FIG. 3. The MCPFs in FIG. 4 consist of three optical components 470 and a controller 460.

A controller 460 can include such as those described in U.S. patent application Ser. No. 15/621,553 filed Jun. 13, 2017, by the same assignee as the subject patent application, which is incorporated by reference in its entirety.

The MCPF may either filter the light propagating from a scene towards a viewing subsystem 410, as in FIG. 2, or it may filter the light propagating towards a scene from a source of illumination 420, as in FIG. 3. The three optical elements are a linear polarizer 430, a 90 degree twisted nematic (TN) liquid crystal cell meeting a Mauguin condition 440, and a broadband quarter-wave plate 450.

A Mauguin condition, can include conditions such as those described in U.S. patent application Ser. No. 15/621,553 Jun. 13, 2017, to the same assignee as the subject patent application, which is incorporated by reference in its entirety.

The broadband quarter-wave plate has the property that it provides close to one quarter wave of optical retardance across the spectral band of the viewing subsystem used with the MCPF. The optical components are aligned such that when the TN cell switches, the MCPF converts from passing LHCP light and blocking RHCP light, to passing RHCP light and blocking LHCP light. The MCPF configuration illustrated in FIG. 4 has the property that for areas of the scene that emanate unpolarized light, the brightness and color of these areas of the scene do not change when the TN cell switches. The function of the controller is to switch the TN cell at a controlled rate compatible with the viewing subsystem and with the function of the modulated circular polarization viewing system.

Figure 5:
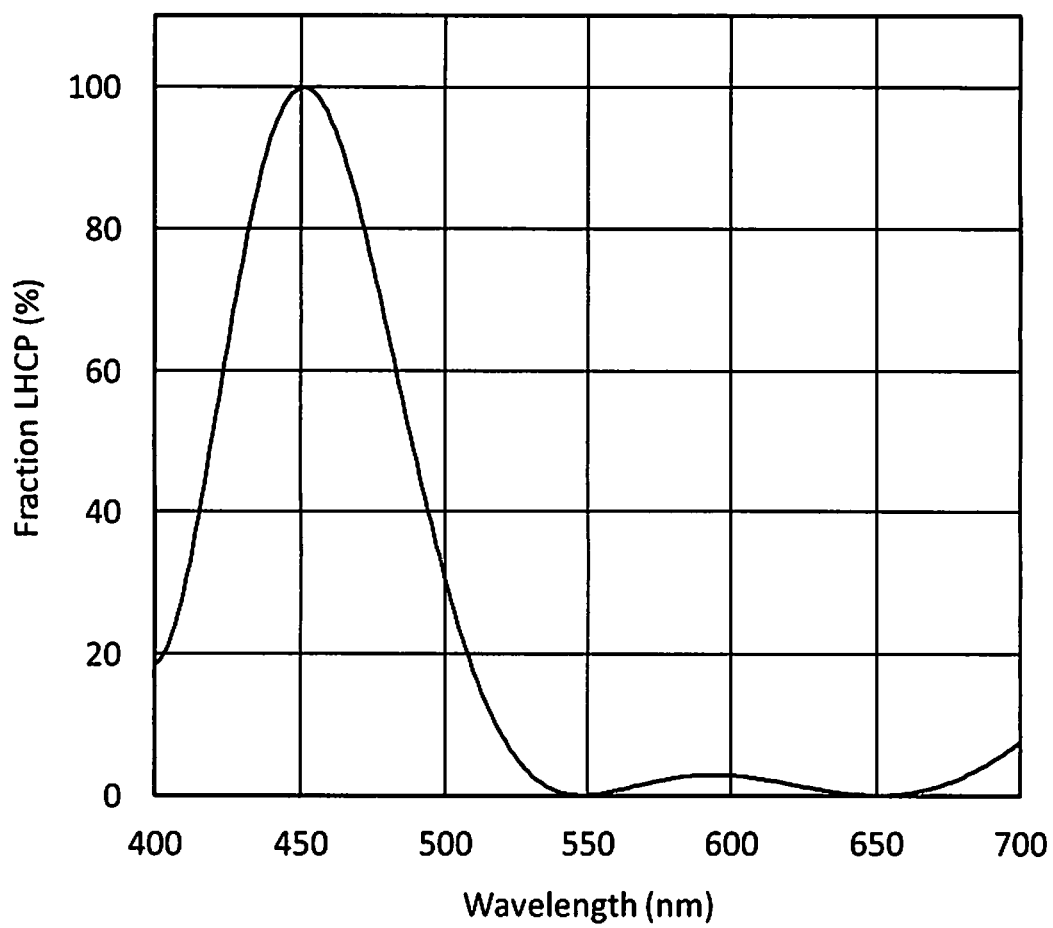
FIG. 5 illustrates the fraction of light that is left-hand circularly polarized (LHCP) at the output of a spectrally-tailored waveplate, with right-hand circularly polarized (RHCP) light at the input to the waveplate. The purpose of the spectrally-tailored waveplate is to invert the circular polarization of transmitted light over part of the visible wavelength band, without changing the circular polarization of transmitted light over the remainder of the visible wavelength band.

For the MCPF configuration illustrated in FIG. 4, the ratio of the transmission of optical power of one circular polarization to the transmission of optical power of the other circular polarization is independent of wavelength within the bandwidth of the viewing subsystem. Variants of this configuration will be evident to those skilled in the art to make this ratio dependent on wavelength for those applications wherein this would be a desirable feature. One such method is illustrated in FIG. 5. In that figure, the effect of a spectrally-tailored waveplate on the circular polarization of light transmitted through this waveplate is shown. With RHCP light at the input of the waveplate over the entire visible wavelength band, 400 nm wavelength to 700 nm wavelength, the light at the output of the waveplate is still RHCP over the band from 550 nm wavelength to 700 nm wavelength, while radiation near 450 nm wavelength (blue) has been converted by the waveplate to LCHP. If such a waveplate is added as an additional component to the MCPF 340 in FIG. 3, and if the scene 310 contains objects that have been treated to reflect only one circular polarization over the entire visible wavelength band, then these treated objects will appear to change color as the MCPF temporally modulates the circular polarization of illumination light transmitted towards the scene 310.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A modulated circular polarization viewing system comprising:
   treatments of objects to emanate fully or partially circularly polarized light or electromagnetic radiation due to differential circular polarization reflectance when illuminated with unpolarized light or other unpolarized electromagnetic radiation;
   a source of unpolarized illumination;
   a viewing subsystem; and
   in the optical path of the viewing subsystem, a modulated circular polarization filter that temporally modulates the circular polarization of the light or other electromagnetic radiation emanating from the object when passing through the modulated circular polarization filter.

2. The modulated circular polarization viewing system of claim 1 wherein the modulated circular polarization filter comprises at least a broadband quarter-wave plate, a 90 degree twisted nematic liquid crystal cell meeting a Mauguin condition, a linear polarizer, and a controller for modulating the twisted nematic liquid crystal cell.

3. The modulated circular polarization viewing system of claim 2 wherein the light or other electromagnetic radiation emanating from paints, pigments, or other treatments of objects is primarily of one circular polarization over most or all of the bandwidth of the viewing subsystem.

4. The modulated circular polarization viewing system of claim 2 wherein the light or other electromagnetic radiation emanating from paints, pigments, or other treatments of objects has the property that the ratio of the emanated optical power of one circular polarization to the emanated optical power of the other circular polarization is dependent on wavelength within the bandwidth of the viewing subsystem.

5. The modulated circular polarization viewing system of claim 2 wherein at any given time within the modulation period of the modulated circular polarization filter, the transmittance of optical power through said filter is higher for one circular polarization than for the other circular polarization over most or all of the bandwidth of the viewing subsystem.

6. The modulated circular polarization viewing system of claim 2 wherein at any given time within the modulation period of the modulated circular polarization filter, the ratio of the transmittance of optical power of one circular polarization through said filter to the transmittance of optical power of the other circular polarization through said filter is dependent on wavelength within the bandwidth of the viewing subsystem.

7. The modulated circular polarization viewing system of claim 1 wherein the treatments of objects are selected from one at least one of paints and pigments.

8. A modulated circular polarization viewing system comprising:
   treatments of objects to emanate fully or partially circularly polarized light or other electromagnetic radiation when illuminated with unpolarized light or other unpolarized electromagnetic radiation, due to differential circular polarization reflectance;
   a source of unpolarized illumination;
   a viewing subsystem; and
   in the optical path of the source of unpolarized illumination, a modulated circular polarization filter.

9. The modulated circular polarization viewing system of claim 8 wherein the modulated circular polarization filter comprises at least a broadband quarter-wave plate, a 90 degree twisted nematic liquid crystal cell meeting a Mauguin condition, a linear polarizer, and a controller for modulating the twisted nematic liquid crystal cell.

10. The modulated circular polarization viewing system of claim 9 wherein the light or other electromagnetic radiation emanating from paints, pigments, or other treatments of objects is primarily of one circular polarization over most or all of the bandwidth of the viewing subsystem.

11. The modulated circular polarization viewing system of claim 9 wherein the light or other electromagnetic radiation emanating from the paints, pigments, or other treatments of objects has the property that the ratio of the emanated optical power of one circular polarization to the emanated optical power of the other circular polarization is dependent on wavelength within the bandwidth of the viewing subsystem.

12. The modulated circular polarization viewing system of claim 9 wherein at any given time within the modulation period of the modulated circular polarization filter, the transmittance of optical power through said filter is higher for one circular polarization than for the other circular polarization over most or all of the bandwidth of the viewing subsystem.

13. The modulated circular polarization viewing system of claim 9 wherein at any given time within the modulation period of the modulated circular polarization filter, the ratio of the transmittance of optical power of one circular polarization through said filter to the transmittance of optical power of the other circular polarization through said filter is dependent on wavelength within the bandwidth of the viewing subsystem.

14. The modulated circular polarization viewing system of claim 8 wherein the treatments of objects are selected from one at least one of paints and pigments.

* * * * *